(12) United States Patent
Shi et al.

(10) Patent No.: US 7,940,989 B2
(45) Date of Patent: May 10, 2011

(54) APPARATUS AND METHOD FOR A GENERALIZED BENFORD'S LAW ANALYSIS OF DCT AND JPEG COEFFICIENTS

(75) Inventors: Yun-Quing Shi, Millburn, NJ (US); DongDong Fu, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 980 days.

(21) Appl. No.: 11/772,636

(22) Filed: Jul. 2, 2007

(65) Prior Publication Data
US 2008/0031535 A1 Feb. 7, 2008

Related U.S. Application Data

(60) Provisional application No. 60/806,281, filed on Jun. 30, 2006.

(51) Int. Cl.
*G06K 9/00* (2006.01)
*G06K 9/36* (2006.01)
*G06K 9/38* (2006.01)
*G06K 9/46* (2006.01)

(52) U.S. Cl. ......... 382/232; 382/250; 382/251; 382/100

(58) Field of Classification Search .................. None
See application file for complete search history.

(56) References Cited

OTHER PUBLICATIONS

Pietronero et al. "Explaining the uneven distribution of numbers in nature: the laws of Benford and Zipf", Physica A 293, 2001, 297-304.*

Zhigang Fan et al: "Identification of Bitmap Compression History: JPEG Detection and Quantizer Estimation" IEEE Transactions on Image Processing, IEEE Service Center, vol. 12, No. 2, Feb. 2, 2003, pp. 230-235.

Lukas, J. et al: "Estimation of Primary Quantization Matrix in Double Compressed JPEG Images", Proceedings of Digital Forensic Research Workshop (DFRWS) 2003, Aug. 5, 2003-Aug. 8, 2003, pp. 1-17.

Jolion J -M: "Images and Benford's law" Journal of Mathematical Imaging and Vision Kluwer Academic Publishers Netherlands, vol. 14, No. 1, Feb. 2001, pp. 73-81.

Acebo E. et al; "Benford's Law for Natural and Synthetic Images" Eurographics Workshop on Computational Aesthetics OM Graphics, Visualization and Imagin, May 18, 2005-May 20, 2005, p. 169, 171.

Hill et al; "Regularity of digits and significant digits of random variables", Stochastic Processes and Their Applications, North-Holland, vol. 115, No. 10, Oct. 2005, pp. 1723-1743.

Pevny, T et al. "Estimation of Primary Quantization Matrix for Steganalysis of Double-Compressed JPEG Images", Proc. Spie, Electronic Imaging, Security, Forensics, Steganography, and Watermarking of Multimedia Contents, Jan. 28, 2008-Jan. 31, 2008, pp. 1-13.

* cited by examiner

*Primary Examiner* — Samir A Ahmed
*Assistant Examiner* — Li Liu
(74) *Attorney, Agent, or Firm* — Connolly Bove Lodge & Hutz LLP

(57) ABSTRACT

A method and apparatus for a novel statistical model based on Benford's law for the probability distributions of the first digits of the block-DCT and quantized JPEG coefficients. A parametric logarithmic law, the generalized Benford's law, is formulated. Furthermore, some potential applications of this model in image forensics, which include the detection of JPEG compression for images in bitmap format, the estimation of JPEG compression Q-factor for JPEG compressed bitmap image, and the detection of double compressed JPEG image. Experimental results demonstrate the effectiveness of the statistical model used in embodiments of the invention.

20 Claims, 14 Drawing Sheets

APPARATUS AND METHOD FOR A GENERALIZED BENFORD'S LAW ANALYSIS OF DCT AND JPEG COEFFICIENTS

BACKGROUND OF THE INVENTION

Image statistics have played an important role in image processing. In particular, a variety of statistical models have been proposed in the background art for various applications such as image filtering, image coding, image restoration, and image analysis. Moreover, many image processing applications are even impossible to pursue without appropriate statistical models.

The distribution of the JPEG discrete cosine transform (DCT) coefficients can be modeled as generalized Laplacian distribution or generalized Cauchy distribution. However, the probability distribution of the most significant digit of the JPEG DCT coefficients has not been reported in the background art.

Benford's law, also known as the first digit law or significant digit law, is an empirical law which states that the probability distribution of the first digit, x (where x=1, 2, ..., 9), in a set of natural numbers is logarithmic. The Benford's law was originally proposed by F. Benford in the paper entitled: "The law of anomalous numbers," *Proc. Amer. Phil. Soc.*, vol. 78, pp. 551-572, 1938. In particular, if a data set satisfies Benford's law, its significant digits will have the following distribution:

$$p(x)=\log_{10}(1+(1/x)), \text{ where } x=1,2,\ldots,9, \text{ and where } p(x) \text{ stands for probability of } x. \quad (1)$$

The validity of Benford's law has been demonstrated and verified in various domains. While the naturally generated data obey the Benford's law well, the maliciously altered data do not follow this law in general. This property has been widely used in the fraud detection and accounting areas.

Applications of Benford's law in image processing field have been explored by very few researchers and primarily in recent years. One background art example is given by J. M. Jolion, "Images and Benford's law," *Journal of Mathematical Imaging and Vision* 14, 73-81, 2001. Jolion showed that the magnitude of the gradient of an image obeys this law and gives some possible applications in image processing such as entropy coding. Another example of the background art is given by E. Acebo, and M. Sbert, "Benford's law for natural and synthetic images," *Computational Aesthetics in Graphics, Visualization and Imaging*, 2005. Acebo and Sbert demonstrated how light intensities in natural images, under certain constraints, obey the Benford's law closely. However, there are no known previous investigations of the relationship between the distributions of the block-DCT coefficients and Benford's law.

Yet another background art application is given in Z. Fan and R. L. Queiroz, "Identification of bitmap compression history: JPEG detection and quantizer estimation," *IEEE Transaction on Image Processing*, vol. 12, no. 2, February 2003. Fan and Queiroz proposed a JPEG compression detection scheme based on the detection of the blockiness artifacts introduced by JPEG compression. A maximum likelihood estimation method is proposed in their paper to estimate the JPEG quantization table after a JPEG image has been detected. Although their approach demonstrates some good results, its performance at very high compression quality (Q-factor>90) is rather limited and it fails when Q-factor is larger than 95. Therefore, there is a need in the art for expanded application of Benford's law and improved performance for the law in very high compression factors image processing applications.

SUMMARY OF THE INVENTION

The present invention is a novel apparatus and method, using a statistical model based on Benford's, law for determining the probability distribution of the first digit of JPEG coefficients. In particular, embodiments of the present invention examine the distribution of the most significant digit of the JPEG coefficients follows a Benford's-like logarithmic law when the image has been JPEG compressed only once. A parametric empirical model is used to formulate this Benford's-like law. Furthermore, embodiments of the present invention demonstrate that this distribution is very sensitive to a double JPEG compression. That is, the logarithmic law will be violated after a double JPEG compression and this fact can be used to detect that situation. The Benford's-like logarithmic law property of embodiments of the invention can be favorably used in many image processing tasks including, but not limited to: JPEG double-compression detection, identification of JPEG compression history, JPEG Q-factor estimation and digital image forensics. In addition, the embodiments of the invention may also be applied to MPEG images.

One embodiment of the invention is a method, a processor-readable medium and an apparatus for detecting JPEG compression comprising: selecting a bitmap image; performing JPEG compression with a Q-Factor (QF) of 100 on the bitmap image; obtaining AC JPEG coefficients from the compressed bitmap image; computing a $1^{st}$ digit distribution of the AC JPEG coefficients; analyzing the AC JPEG coefficients to determine whether the AC JPEG coefficients satisfy a predetermined distribution; determining the bitmap image as JPEG compressed when the JPEG coefficients do not satisfy the predetermined distribution; and determining the bitmap image as at least one of not JPEG compressed and JPEG compressed with a QF=100 when the JPEG coefficients satisfy the predetermined distribution; and means for doing so.

Another embodiment of the invention is a method, a processor-readable medium and an apparatus for estimating a Q-factor, comprising: selecting a bitmap image that has been JPEG compressed once; performing JPEG compression on the bitmap image with a present Q-factor (QF) of 100; obtaining AC JPEG coefficients from the compressed bitmap image; computing a $1^{st}$ digit distribution of the AC JPEG coefficients; analyzing the AC JPEG coefficients to determine whether the AC JPEG coefficients satisfy a predetermined distribution; determining the estimated QF of the bitmap image as the present QF when the analyzed AC JPEG coefficients satisfy the predetermined distribution; otherwise determining an updated QF by decreasing the present QF by an integer quantity; performing JPEG compression with the updated QF as the present QF when the analyzed AC JPEG coefficients do not satisfy the predetermined distribution; and returning to the analyzing the AC JPEG coefficient step, wherein the integer quantity is dependent upon an accuracy for the estimated QF. Continuing the above until the distribution of the first digit of the resultant AC JPEG coefficients follows the predetermined distribution, and the present QF is estimated as the determined QF; and means for doing so.

Another embodiment of the invention is a method, a processor-readable medium and an apparatus for detecting a JPEG compression of an image, comprising: computing an 8×8, non-overlapping block decomposition of a bitmap image; applying a 2-D discrete block cosine transform (BDCT) to each block decomposition independently; computing a 1st digit distribution of the AC BDCT coefficients of each of the block decomposition; analyzing the 1st digit distribution AC BDT coefficients to determine whether the 1st digit distribution satisfies a predetermined distribution; determining the image has been JPEG compressed once when the 1st digit distribution satisfies the predetermined distribution; and determining the image has not been JPEG compressed when the 1st digit distribution does not satisfy the predetermined distribution; and means for doing so.

Yet another embodiment of the invention is a method, a processor-readable medium and apparatus for detecting at least a double-compression of a JPEG image, comprising: selecting a JPEG image; selecting AC JPEG coefficients; computing a 1st digit distribution of the AC JPEG coefficients; analyzing the 1st digit distribution to determine whether the distribution satisfies a predetermined distribution; determining the image has been JPEG compressed once when the distribution satisfies the predetermined distribution; and determining the image has been JPEG compressed by two or more quality factor (QF) values when the distribution does not satisfy the predetermined distribution; and means for doing so.

BRIEF DESCRIPTION OF THE DRAWINGS

Embodiments of the invention can be described in greater detail with the aid of the following drawings.

DETAILED DESCRIPTION OF THE PREFERRED EMBODIMENT

Figure 1:
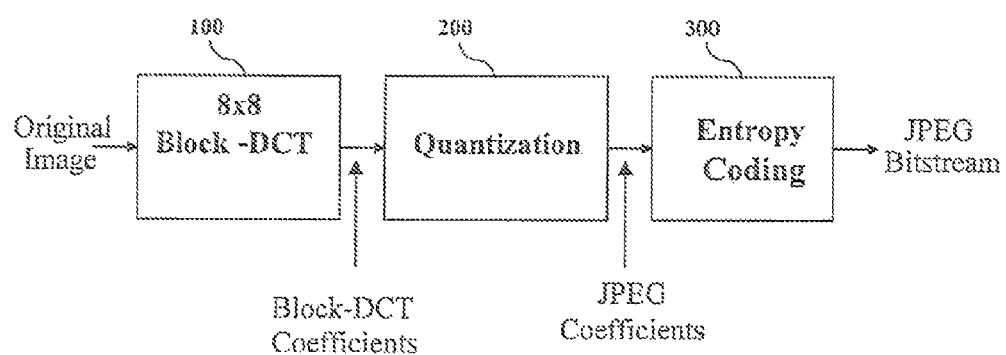
FIG. 1 is an exemplary block diagram of JPEG compression with 8×8 Block DCT coefficients.

A relationship between the distributions for block-DCT coefficients and Benford's law is further discussed in the following paragraphs. In particular, JPEG compression is a popular image compression technology and is block-DCT based. A simplified, exemplary block diagram of the JPEG compression algorithm is illustrated in FIG. 1. In JPEG compression, the original image is first divided into non-overlapped 8×8 blocks. The two-dimensional DCT function 100 is then applied to each block, as shown in FIG. 1. After that, the block-DCT coefficients go through a quantization function 200 where they are quantized using a JPEG quantization table. In this application, the term "block-DCT coefficients" is used to refer to the 8×8 block-DCT coefficients before quantization and "JPEG coefficients" is used to refer to the 8×8 block-DCT coefficients after the quantization with a JPEG quantization table. If it is not stated explicitly, in embodiments of the invention, only the alternating current (AC) or non-zero frequency components of both the block-DCT coefficients and the JPEG coefficients are considered.

As discussed above, in the background art, the probability distributions of both the block-DCT coefficients and JPEG coefficients are typically modeled as a Laplacian distribution or Cauchy distribution. However, in contrast to the background art, embodiments of the present invention use a Benford's logarithmic law distribution to model the most significant digits of the block-DCT coefficients and JPEG coefficients. It should be noted, that though the same principles used in embodiments of the invention can easily be extended to color images and images that may have various numbers of bits-of-resolution, preferably, only 8-bit gray level images are used.

An Uncompressed Image Database (UCID) is given in G. Schaefer and M. Stich (2003) "UCID—An Uncompressed Colour Image Database," *Technical Report*, School of Computing and Mathematics, Nottingham Trent University, U.K.

This is a publicly available uncompressed image database which consists of 1,338 uncompressed images (i.e., version 2) in tiff format and was used in the experiments that verify the performance of embodiments of the invention. The images in the UCID database are quite diverse and are popularly used in image processing research community. Since the images in UCID are color images, only the luminance component was considered in the experiments. The relationship between block-DCT coefficients and the generalized Benford's law of embodiments of the invention will be further discussed in the following paragraphs To investigate the statistical characteristics of the block-DCT coefficients' first digit distribution, a block-DCT is computed for each image of the UCID database, and the frequencies of the first digits are then calculated. As discussed further below, our experimental results indicate that the distribution of the first digits of the block-DCT coefficients satisfy, follow or fit the Benford's logarithmic law quite well. It should be noted that the terms satisfy, follow and fit are used interchangeably in describing the present invention.

Figure 2:
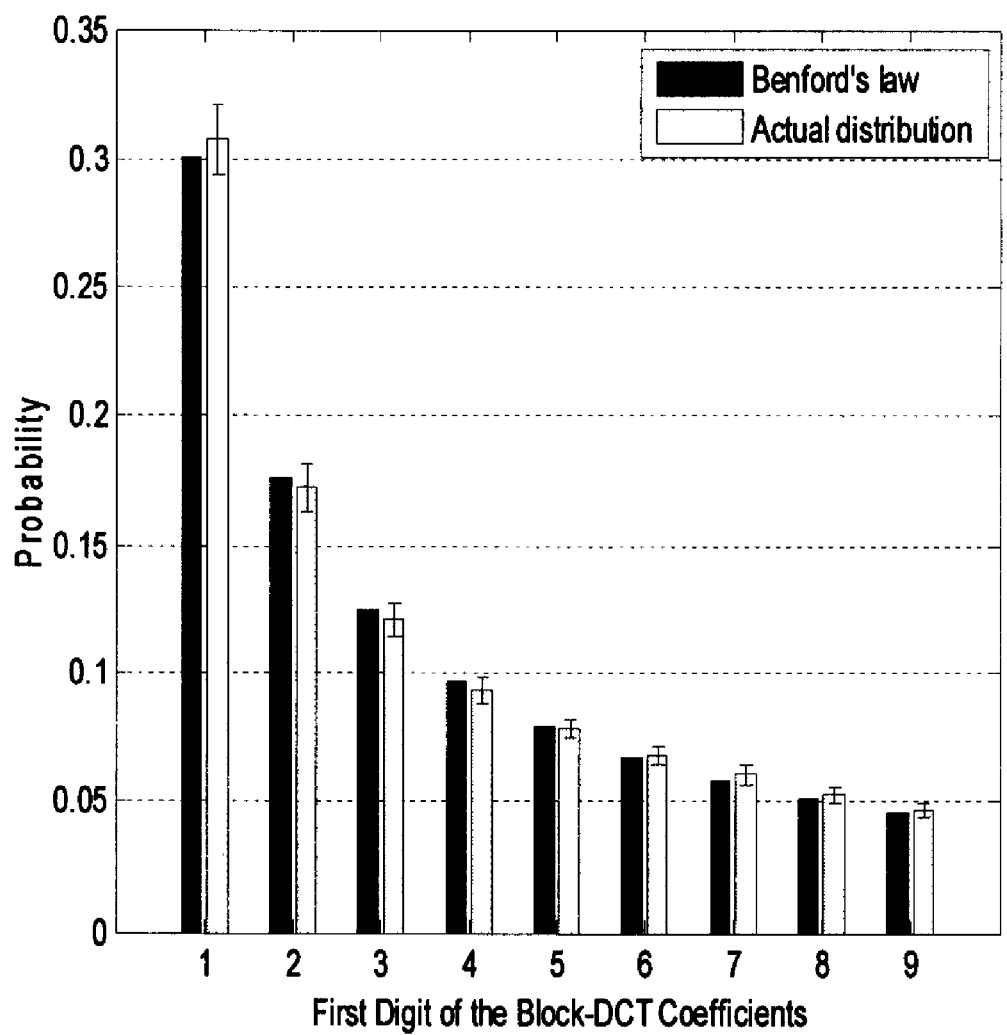
FIG. 2 is an exemplary graph showing the first digit distribution of the block-DCT coefficients for UCID database.

FIG. 2 shows some exemplary experimental results. In FIG. 2, the clear bars to the right show the mean distribution of the first digits of the block-DCT coefficients of the 1,338 images in the UCID database. Error bars, located at the top of the clear bars, denote the standard deviations of the distributions for the images of the UCID database. For comparison purposes, the Benford's logarithmic law is also illustrated in the solid bars on the left in FIG. 2 for comparison purposes. As can be seen from FIG. 2, the probability distributions of the first digits of the block-DCT coefficients of the UCID database follow the standard Benford's logarithmic law (i.e., as defined by Equation (1)) very well. The quality of the fitting can be measured with the $X^2$ divergence given in Equation (2) as:

$$\chi^2 = \sum_{i=1}^{9} \frac{(\hat{p}_i - p_i)^2}{p_i} \quad (2)$$

where $\hat{p}_i$, is the actual first digit probability and $p_i$ is the probability predicted by Benford's law as defined in Equation (1), namely, $$p_i = \log_{10}\left(1 + \frac{1}{i}\right).$$

The average of $X^2$ divergences for the fitting of all the UCID database images is only 0.0034, which indicates a very good ability for embodiments of the invention to satisfy, follow or fit the results.

The relationship between JPEG coefficients and the Generalized Benford's law of embodiments of the invention are further discussed in the following paragraphs. In particular, the first digit distribution of the JPEG quantized block-DCT coefficients, namely, the JPEG coefficients is investigated. For this purpose, let I denote an image. Let h(x) be the probability mass function (PMF) or the normalized histogram of the JPEG coefficients of the image I. As discussed above, the function h(x) has typically been modeled as generalized Laplacian distribution or Cauchy distribution in image processing applications. A characteristic of these distributions is that they have a high peak in zero and long tails towards two sides horizontally.

Figure 3A:
FIG. 3(a) is an exemplary JPEG compressed Pepper image.
Figure 3B:
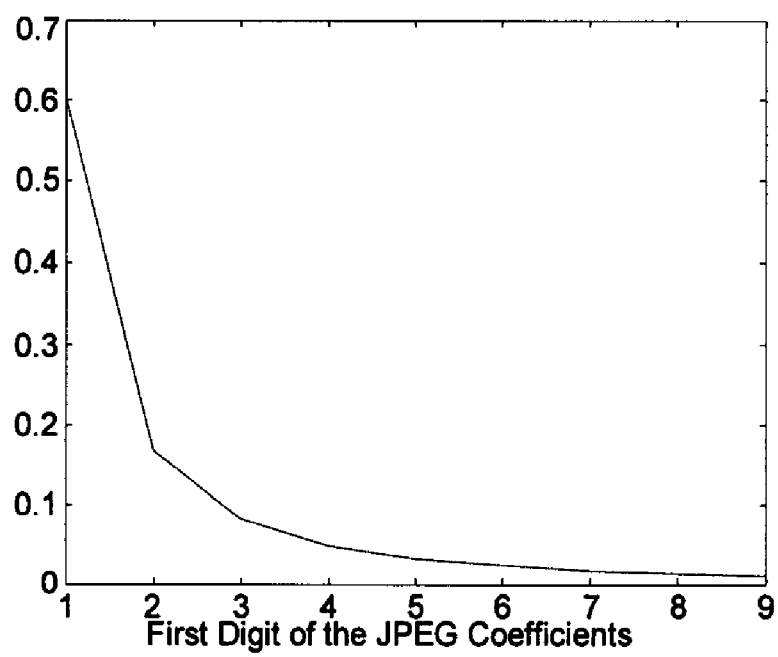
FIG. 3(b) is an exemplary distribution of the first digits of JPEG coefficients.

As an example, FIG. 3(a) shows the image of a pepper that is popularly used in image processing. In FIG. 3(b), the first digits distribution of the JPEG coefficients for this image with a Quality-factor (Q-factor) of 90 is shown. Compared with the histogram, the first digit distribution is much simpler because only the first digits 1, 2, ..., 9 are involved. Also, as can be seen in FIG. 3(b), this distribution approximately follows a logarithmic law. This observation has been verified through the experimental results presented below.

In our experiments, the uncompressed UCID image database discussed above was used. Use of this uncompressed image database in testing guarantees that we know exactly the compression history of the images under investigation. To generate JPEG compressed images, all the images were JPEG compressed in the above-mentioned database with the following different Q-factors: 100, 90, 80, 70, 60 and 50, as shown in FIGS. 4(a), 4(b), 4(c), 4(d), 4(e) and 4(f), respectively.

In order to understand the statistical properties of the first digits of the JPEG coefficients in a JPEG compressed image, the distributions are averaged for the first digits of the JPEG coefficients obtained from the 1,338 images of the UCID database. As noted above, FIG. 4(a) to FIG. 4(f) plot the mean distributions of the first digits of the JPEG coefficients under different JPEG compression Q-factors, as the clear (i.e., not shaded), centrally located bar. For comparison purpose, the distribution of Benford's law, as defined in Equation (1), is also plotted as the left-most (i.e., lightly shaded) bar in the FIG. 4(a) to FIG. 4(f). Comparing these distributions with the generalized Benford's logarithmic law distribution of embodiments of the invention, as plotted in the right-most (i.e., darkly-shaded) bar in the figures, indicates that the distribution of the first digits of the JPEG coefficients do not follow the Benford's law (i.e., lightly shaded bar) in its rigorous form as shown in Equation (1). In addition, it should be noticed that these distributions still approximately follow a logarithmic law. Therefore, embodiments of the invention, which utilize a model of the distribution of the first digits of the JPEG coefficients that is a parametric logarithmic function, called a generalized Benford's logarithmic law, as given in Equation (3) as:

$$p(x) = N\log_{10}\left(1 + \frac{1}{s + x^q}\right), x = 1, 2, \ldots, 9 \quad (3)$$

where N is a normalization factor which makes p(x) a probability distribution, s and q are model parameters that precisely describe the distributions for different images and different compression Q-factors. As we can see, when s=0 and q=1, Equation (3) reduces to Equation (1), which means that the distribution of Benford's law is just a special case of the distribution model for embodiments of the invention.

Figure 4A:
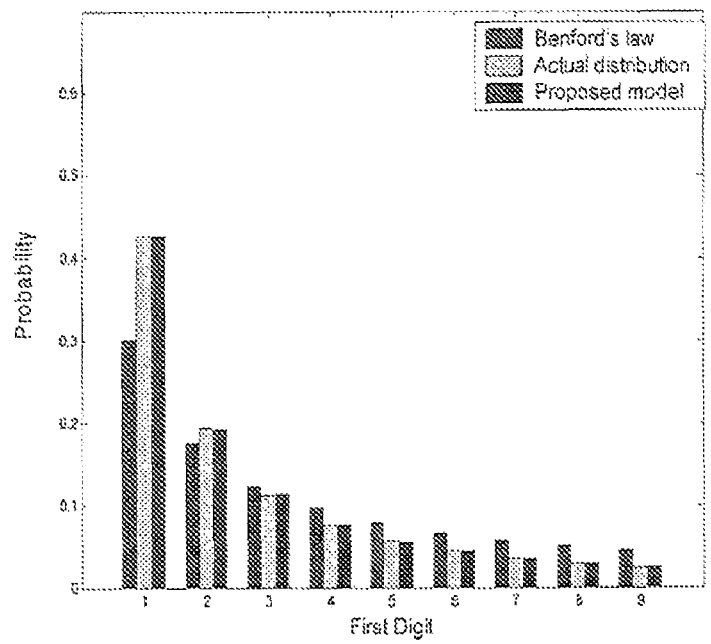
FIG. 4(a) illustrates mean distributions of the first digits of JPEG coefficients under a Q-Factor (QF)=100.
Figure 4B:
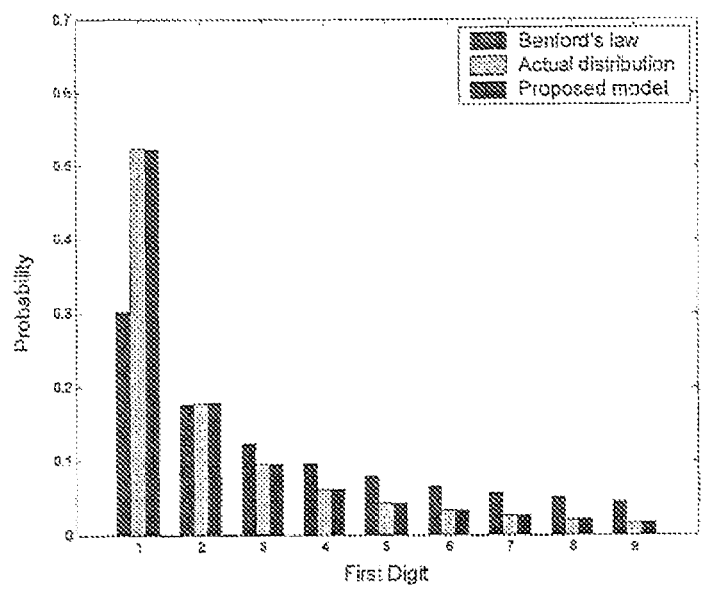
FIG. 4(b) illustrates mean distributions of the first digits of JPEG coefficients under QF=90.
Figure 4C:
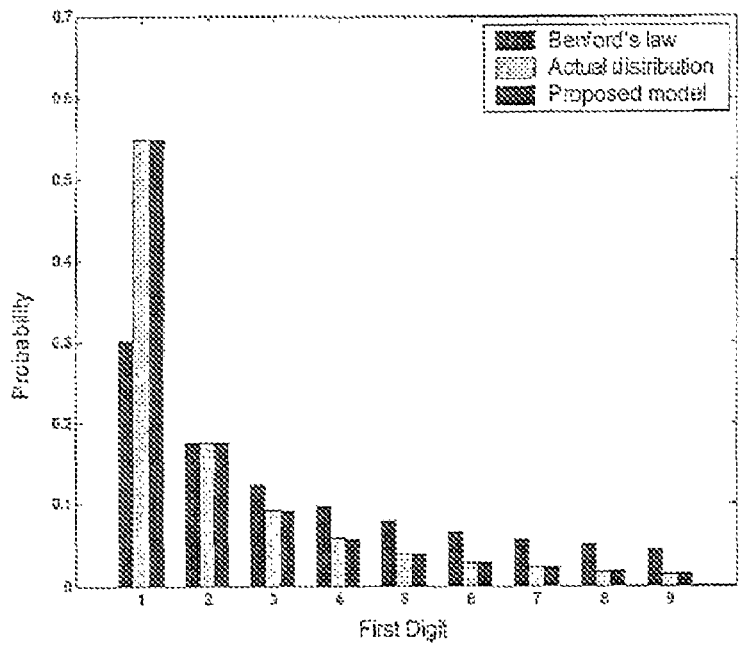
FIG. 4(c) illustrates mean distributions of the first digits of JPEG coefficients under a QF=80.
Figure 4D:
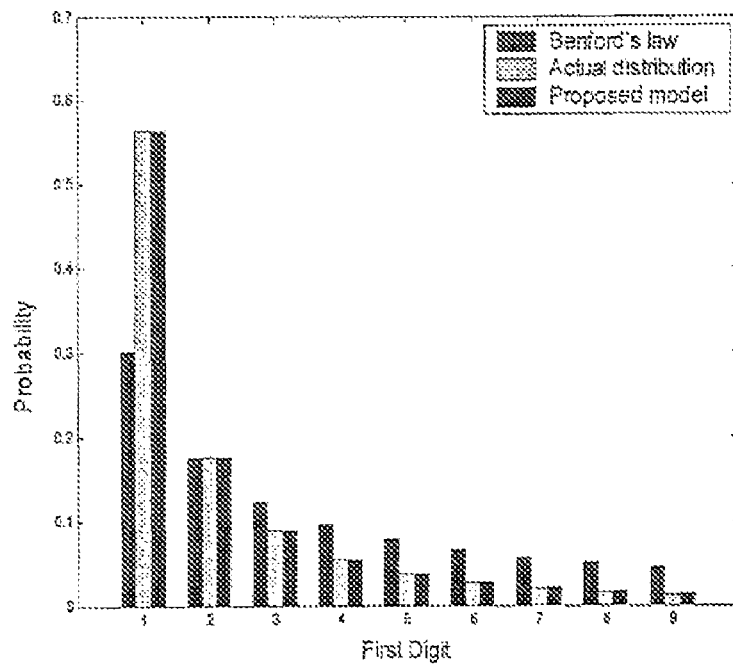
FIG. 4(d) illustrates mean distributions of the first digits of JPEG coefficients under a QF=70.
Figure 4E:
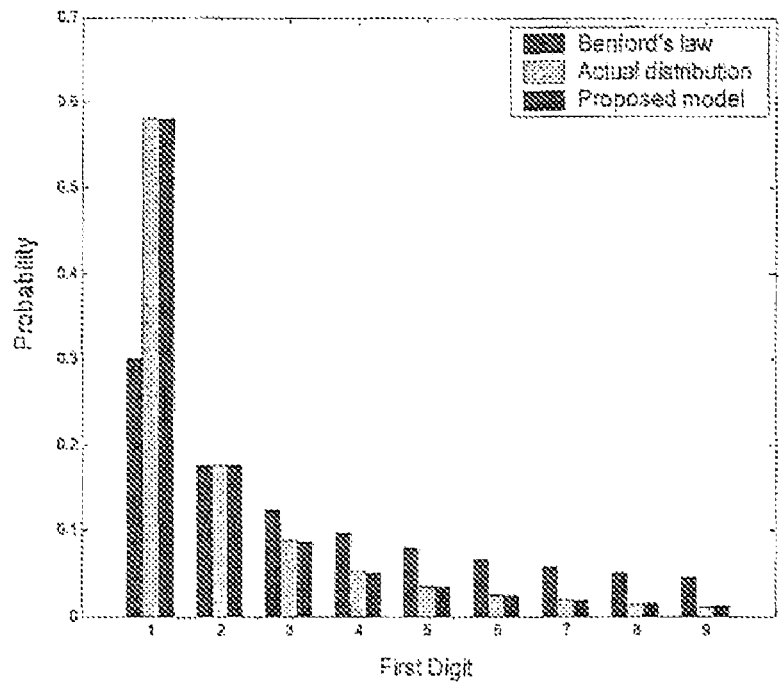
FIG. 4(e) illustrates mean distributions of the first digits of JPEG coefficients under a QF=60.
Figure 4F:
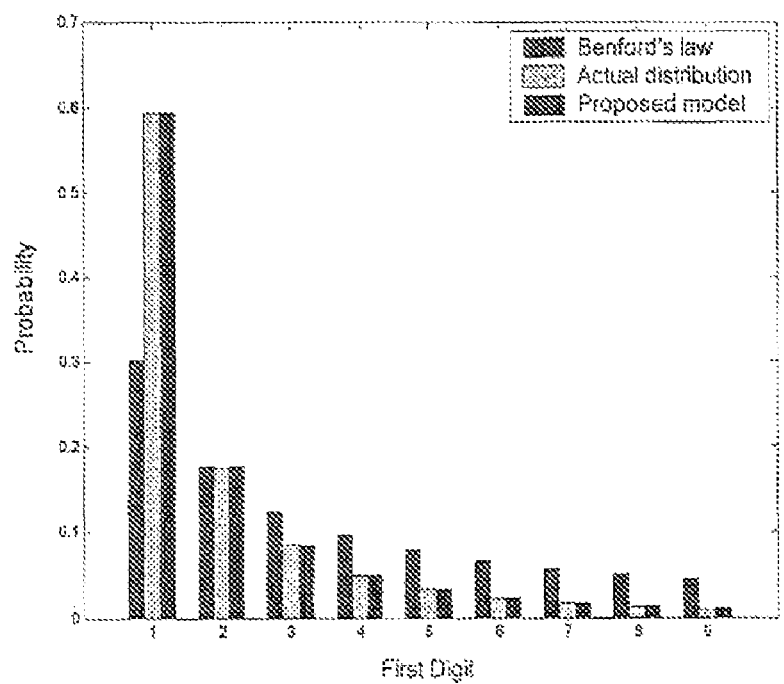
FIG. 4(f) illustrates mean distributions of the first digits of JPEG coefficients under a QF=50.

To illustrate the effectiveness of the model used in the embodiments of the invention, examine how the model satisfies, follows and/or numerically fits the results in Table 1 for UCID database. The Matlab® curve fitting tool box is used for data fitting in this application. The Matlab® toolbox returns a goodness-of-fit statistic called Sum of Squares due to Error (SSE), as given in the last column of Table 1. Other measures can also be used. From Table 1, it can be observed that the SSEs are only in the order of $10^{-6}$. The fitting results of the model used he invention are also illustrated in FIG. 4(a) to FIG. 4(f) (i.e., see the right-most bar). As seen in FIG. 4(a)

to FIG. 4(f), the model used by embodiments of the invention satisfies, follows and fits the actual mean distributions of the UCID database perfectly.

TABLE 1

The fitting goodness of the proposed model for UCID database (Sum of Squares due to Errors (SSE)).

| Q-factor | Model Parameters | | | Goodness-of-fit |
| --- | --- | --- | --- | --- |
| | N | q | s | (SSE) |
| 100 | 1.456 | 1.47 | 0.0372 | 7.104e−06 |
| 90 | 1.255 | 1.563 | −0.3784 | 5.255e−07 |
| 80 | 1.324 | 1.653 | −0.3739 | 3.06838e−06 |
| 70 | 1.412 | 1.732 | −0.337 | 5.36171e−06 |
| 60 | 1.501 | 1.813 | −0.3025 | 6.11167e−06 |
| 50 | 1.579 | 1.882 | −0.2725 | 6.05446e−06 |

Figure 5A:
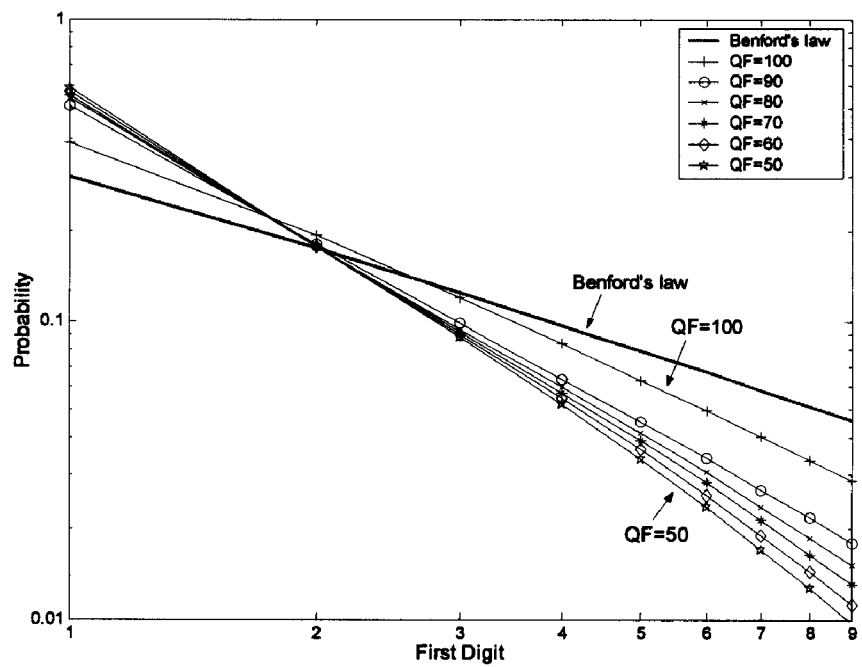
FIG. 5(a) illustrates the mean distributions of the first digit of JPEG coefficients for a Harrison image databases.
Figure 5B:
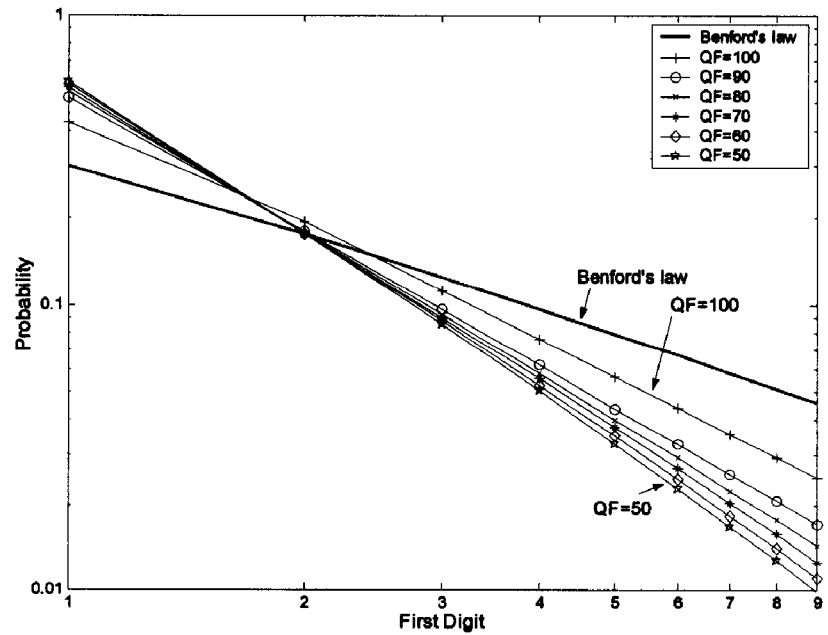
FIG. 5(b) illustrates the mean distributions of the first digit of JPEG coefficients for the UCID image databases.

In order to demonstrate the general applicability of embodiments of the invention, experiments on another uncompressed database, referred to as Harrison, were performed. The Harrison database consists of 198 images taken by our group members in Harrison, N.J. with a Canon G2 camera and stored in RAW format. To illustrate these distributions in a more clear way, they are plotted in log-log scale in FIG. 5(a) and FIG. 5(b) (note: all the rest figures are plotted in log-log scale for display purposes). That is, in FIG. 5(a) and FIG.(b), both the vertical axis and the horizontal axis are set in logarithmic scale. The distributions under different Q-factors (QF) (i.e., ranging from 100 to 50) are displayed in the The distribution of Benford's law for comparison is also shown in FIG. 5(a) and FIG. 5(b0. As can be seen from the figures, although these two image datasets (i.e., Harrison and UCID) are quite different, the distributions of the first digits of the JPEG coefficients approximately follow the same law. In addition, one notices that when Q-factor becomes small (e.g., 50), the distribution of the first digits of the JPEG coefficients is almost a straight line in log-log space. This characteristic indicates that this distribution can even be approximated by a simple power law.

As discussed and shown above and as shown in FIG. 2 and FIG. 4(a) to FIG. 4(f), the first digit distribution of the block-DCT coefficients follows the standard Benford's law while that of the JPEG coefficients follow the generalized Benford's logarithmic law used in embodiments of the invention. Experimental investigations have demonstrated that it is the quantization function (i.e., FIG. 1, ref. 200) in the JPEG Compression scheme that causes this difference. It is further demonstrated in FIG. 5(a) and FIG. 5(b) that it is the quantization that causes the more severe monotonic decrease in the curves of the mean distribution as the Q-factor decreases.

As discussed and demonstrated above, the distribution of the first digits of the JPEG coefficients of a JPEG compressed image follow the generalized Benford's logarithmic law of the invention that has an empirical model that is expressed in Equation (3) above. In the following, it is further demonstrated that this logarithmic law will be violated if the image is double JPEG compressed using different Q-factors. This property can be used in a variety of image processing applications such as, detection of the JPEG compression for bitmap image, detection of JPEG double-compression, and estimation of JPEG Q-factor in JPEG compressed bitmap images.

One exemplary embodiment of the invention is a method for the detection of the JPEG compression for a bitmap image is discussed in the following paragraphs. In particular, a method for detecting whether an image in bitmap format has been previously JPEG compressed is developed. This method is important in several image processing applications as well as in image forensics. For example, given an image in bitmap format, there is no side information to tell the compression history. Even if it has been JPEG compressed before, there is no way to know and retrieve the compression quantization table through the format side information. Thus, one must explores the characteristics of the image itself to identify the JPEG compression history of a given bitmap image. The JPEG compression detection algorithm based on the generalized Benford's logarithmic law first digit distribution of embodiments of the invention provides one with the means of exploring the characteristics of the image to detect prior compression.

Results of testing of embodiments of the invention on the UCID database are given below. To prepare JPEG compressed image, we compress all 1,338 uncompressed images into JPEG files by using different Q-factors (i.e., 99, 95, 90, 80, 70, and 60). Then, all these compressed images are decompressed and stored in bitmap format again for experimental investigation. Our goal is to utilize embodiments of the invention to determine whether an image has ever been JPEG compressed or not.

An exemplary application that can be used to perform the JPEG compressions is the Matlab® imwrite function. A standard JPEG quantization table is used in these performance measurement experiments. Also, in these performance measurement experiments, it is assumed that the grid origin of 8×8 blocks is known. For a JPEG image with non-standard quantization table, it is believed that similar results can be expected. The JPEG compression detection method of embodiments of the invention is based on the observation that: (1) the first digit distribution of the JPEG coefficients of single compressed images obeys the generalized Benford's logarithmic law; and (2) the first digit distribution of the JPEG coefficients of double compressed images does not.

In embodiments of the invention, for a given bitmap test image, compression is first performed with a JPEG Q-factor 100 (i.e., the largest possible Q-factor in JPEG compression. In this way, if the given bitmap image has not been JPEG compressed previously, the resulting image is a single JPEG compressed image with Q-factor 100. The first digit distribution of the JPEG coefficients is then obtained. If the given bitmap image has not previously been JPEG compressed, this first digit distribution should follow the generalized Benford's-like logarithmic law perfectly, as discussed above.

On the other hand, if the given bitmap image has ever been JPEG compressed previously, the resulting image is a double JPEG compressed image with the secondary Q-factor 100. In this case, the Benford's-like logarithmic law of embodiments of the invention will obviously be violated. Therefore, embodiments of the invention can discriminate between an originally uncompressed image and one that has been compressed.

Figure 6:
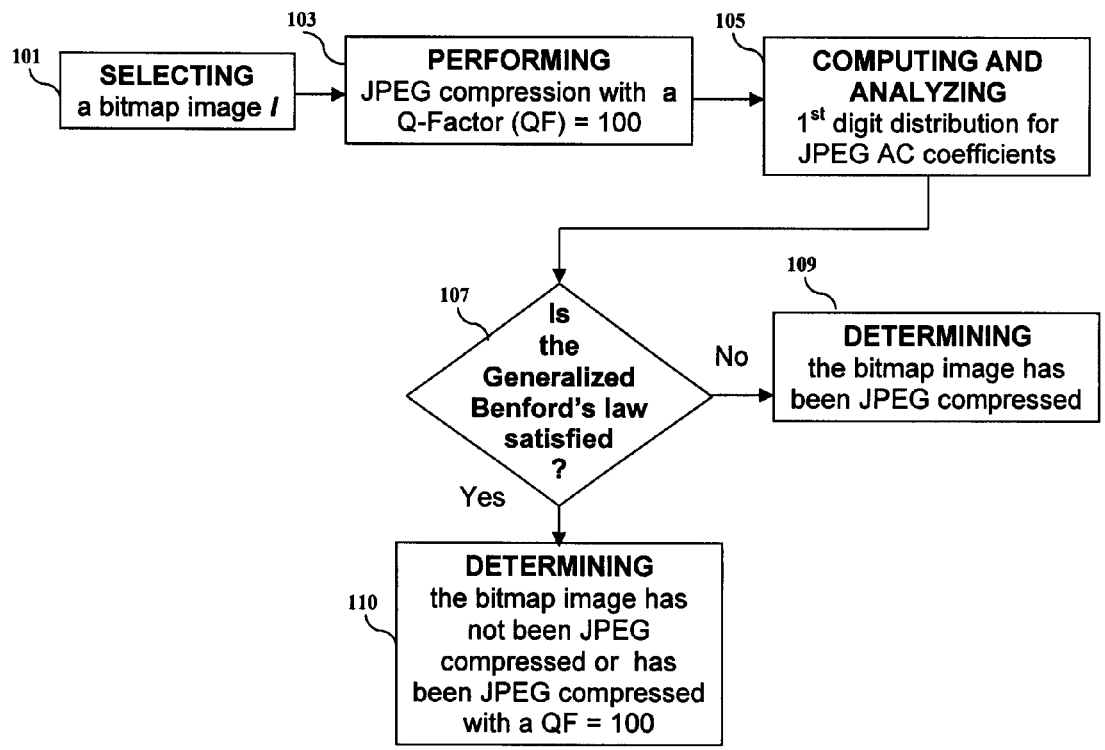
FIG. 6 is an exemplary flow diagram of a method for detecting JPEG compression of a bitmap image.
Figure 7A:
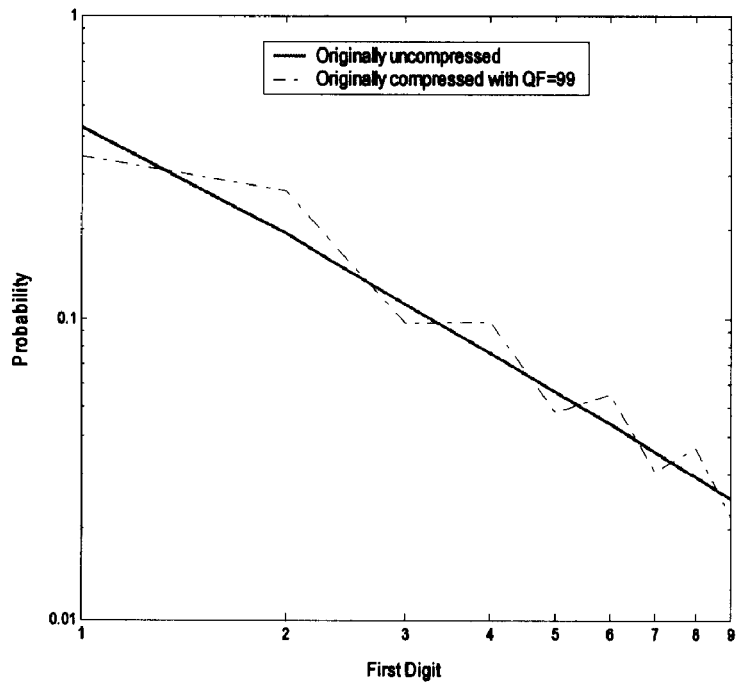
FIG. 7(a) illustrates the mean distribution of JPEG coefficients' first digits of the uncompressed bitmap images (solids curve) and that of the JPEG compressed bitmap images with different Q-factors (QF) (dashed curve) for QF=99 after re-compressed with JPEG Q-factor 100.
Figure 7B:
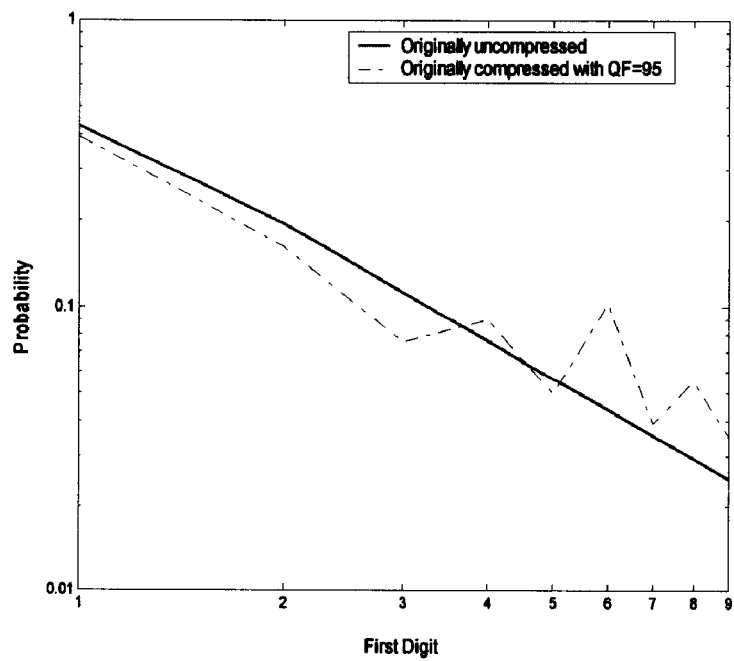
FIG. 7(b) illustrates the mean distribution of JPEG coefficients' first digits of the uncompressed bitmap images (solids curve) and that of the JPEG compressed bitmap images with different Q-factors (QF) (dashed curve) QF=95 after re-compressed with JPEG Q-factor 100.
Figure 7C:
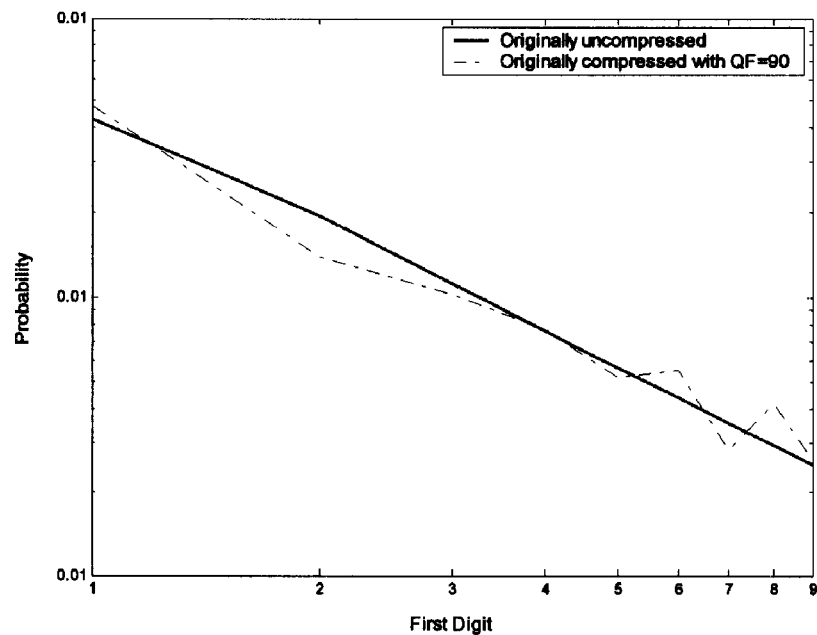
FIG. 7(c) illustrates the mean distribution of JPEG coefficients' first digits of the uncompressed bitmap images (solids curve) and that of the JPEG compressed bitmap images with different Q-factors (QF) (dashed curve) QF=90 after re-compressed with JPEG Q-factor 100.
Figure 7D:
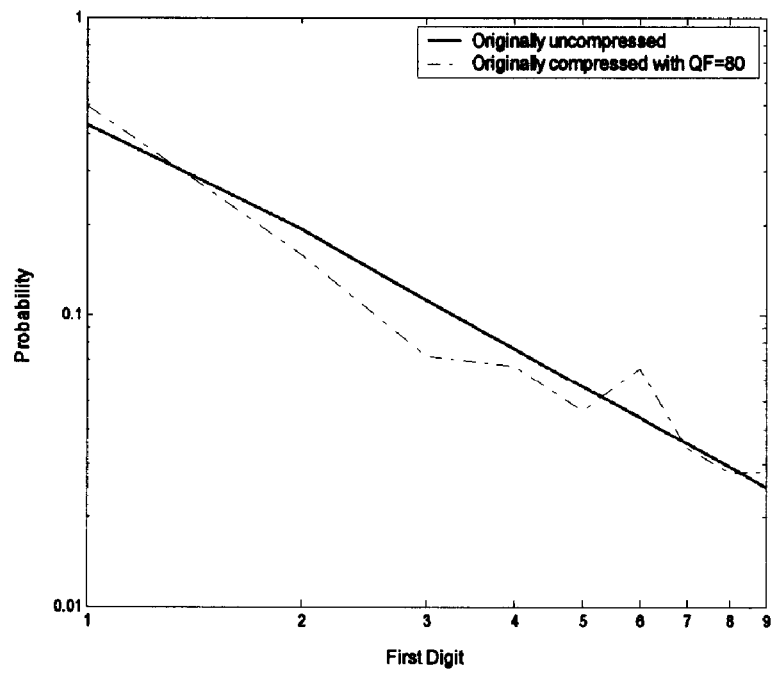
FIG. 7(d) illustrates the mean distribution of JPEG coefficients' first digits of the uncompressed bitmap images (solids curve) and that of the JPEG compressed bitmap images with different Q-factors (QF) (dashed curve) QF=80 after re-compressed with JPEG Q-factor 100.
Figure 7E:
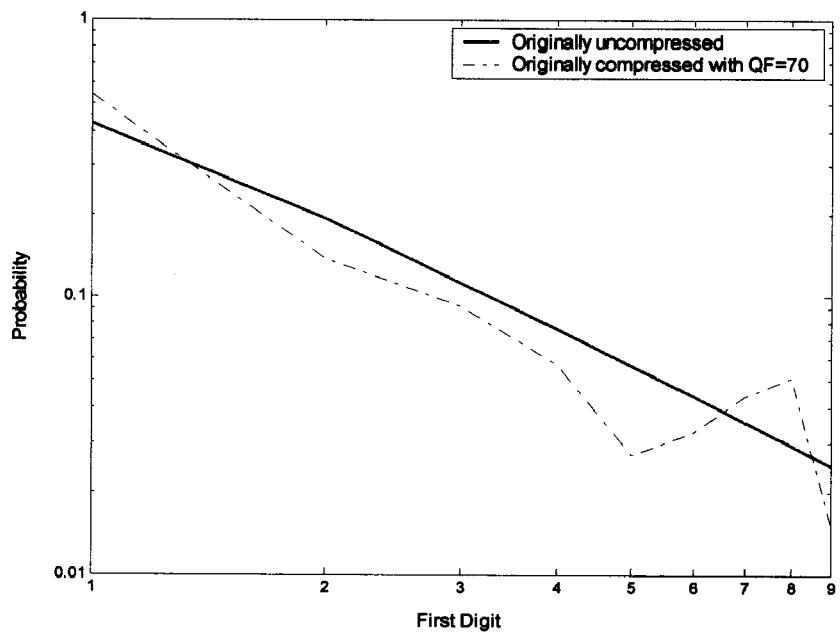
FIG. 7(e) illustrates the mean distribution of JPEG coefficients' first digits of the uncompressed bitmap images (solids curve) and that of the JPEG compressed bitmap images with different Q-factors (QF) (dashed curve) QF=70 after re-compressed with JPEG Q-factor 100.
Figure 7F:
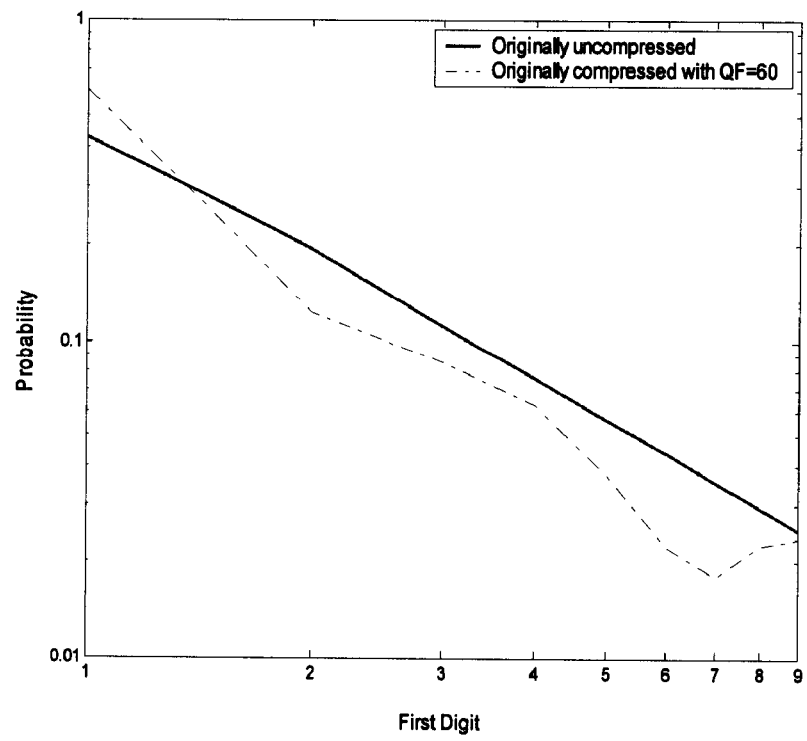
FIG. 7(f) illustrates the mean distribution of JPEG coefficients' first digits of the uncompressed bitmap images (solids curve) and that of the JPEG compressed bitmap images with different Q-factors (QF) (dashed curve) QF=60 after re-compressed with JPEG Q-factor 100.

FIG. 6 is an exemplary flow diagram of a method for detecting JPEG compression. In particular, Step 101 of FIG. 1(b) is selecting a bitmap image (I). Performing a JPEC compression with a Q-factor of 100 occurs in step 103. A 1st digit distribution of the JPEG AC coefficients is computed and analyzed in step 105. Step 107 provides results of the analysis used for determining whether or not the generalized Benford's law is satisfied by the 1st digit distribution of JPEG AC coefficients. If the answer is "NO" in step 107, step 109 determines that the image has been previously JPEG compressed. If the answer is "YES" in step 107, step 110 determines that the image has NOT been previously JPEG compressed or the image has NOT been previously JPEG compressed with a Q-factor of 100.

FIG. 7(a) to FIG. 7(f) are plots of the experimental results for a plurality of Q-factors. These experimental results indicate, if the given image is an uncompressed image followed by JPEG compression with Q-factor 100 (i.e., a single compression with Q-factor 100), the logarithmic law is obeyed quite well (i.e., see the solid curves in the figures).

In contrast to the above, if the given image has been JPEG compressed with Q-factors with one of values among 99, 95, 90, 80, 70 and 60, as shown in FIG. 7(a) to FIG. 7(f), followed by JPEG compression with Q-factor 100, obvious artifacts show up in the first digit distribution of JPEG coefficients (i.e., see the dashed curves in the figures). To illustrate the statistical properties, all of curves in FIG. 7(a) to FIG. 7(f) actually show the mean distributions of the UCID database.

Since the artifacts are so obvious, many classification methods can be used to detect the JPEG compressed image. In addition to various learning algorithms, non-learning algorithms are also possible. For example, these algorithms include, but are not limited to: the goodness-of-fitting. In the experiment, logarithmic functions of the first digit distributions were used as features and a support vector machine (SVM) was used as classifier. A non-limiting example of a SVM is given in C. C. Chang and C. J. Lin, "LIBSVM: a library for support vector machines", 2001. For the images of the UCID database, 5⁄6 of them are used for training and the remaining 1⁄6 are used for testing. The detection results for different Q-factors are listed in Table 2. As shown in Table 2, embodiments of the invention can reliably detect JPEG compression with Q-factor as high as 99, which outperforms the methods proposed in the background art.

TABLE 2

Performance of the proposed JPEG compression detection algorithm.

| | Q-factor | | | | | |
|---|---|---|---|---|---|---|
| | 99 | 95 | 90 | 80 | 70 | 60 |
| Detection Accuracy | 100% | 100% | 100% | 100% | 100% | 100% |

Embodiments of the invention can also be directed toward an estimation of Q-factor for JPEG compressed bitmap image as is discussed in the following paragraphs. After a JPEG one-time compressed bitmap image has been identified, one needs to estimate the quantization table utilized in the JPEG compression because there is no such information in the bitmap file. In embodiments of the invention, the overall Q-factor is estimated instead of individual elements of the quantization matrix at current stage. As stated previously, the standard JPEG quantization table is used in all experiments. It is believed that similar results can also be expected for the case where the JPEG image with non-standard quantization table is used.

The main idea of this embodiment of the invention is that when one re-compresses the previously compressed JPEG image, the distribution of the first digits of the resulting image's JPEG coefficients will violate the Benford's logarithmic law of embodiments of the invention unless the re-compression Q-factor is equal to the original Q-factor.

Figure 8:
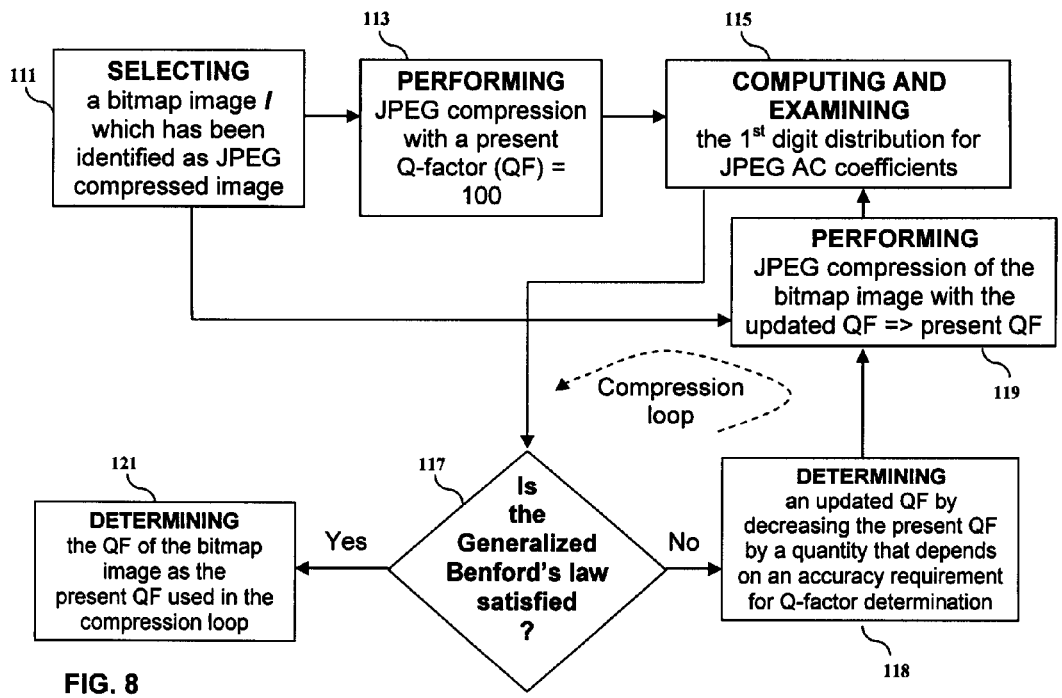
FIG. 8 is an exemplary flow diagram of a method for estimating Q-factor in a bitmap image that has been previously JPEG compressed.

FIG. 8 is an exemplary flow diagram of a method for estimating Q-factor in an image that has been previously JPEG compressed. In particular, Step 111 of FIG. 8 is selecting a bitmap image (I) that has been previously JPEG compressed. Performing a JPEG compression with a Q-factor of 100 occurs in step 613. A 1st digit distribution is computed and analyzed for JPEG AC coefficients in step 115. Step 117 provides results of the analysis used for determining whether the generalized Benford's law is satisfied by the 1st digit distribution of JPEG AC coefficients. If the answer is "NO" in step 117, step 118 determines an updated QF by decreasing the present QF by an integer quantity. The quantity that the Q-factor is decreased depends on the predetermined desired accuracy requirement for the Q-factor determination output of the method. Step 119 stores the updated QF as the present QF and performs a JPEG compression with the present QF value and returns the compression loop to Step 115. The compression loop, of stesps 115, 117, 118 and 119 repeats until a Q-factor meeting the accuracy requirement is obtained. If the answer is "YES" in step 117, step 121 determines that the present QF of the compression loop 115, 117, 118 and 119 is the estimated QF.

Figure 9:
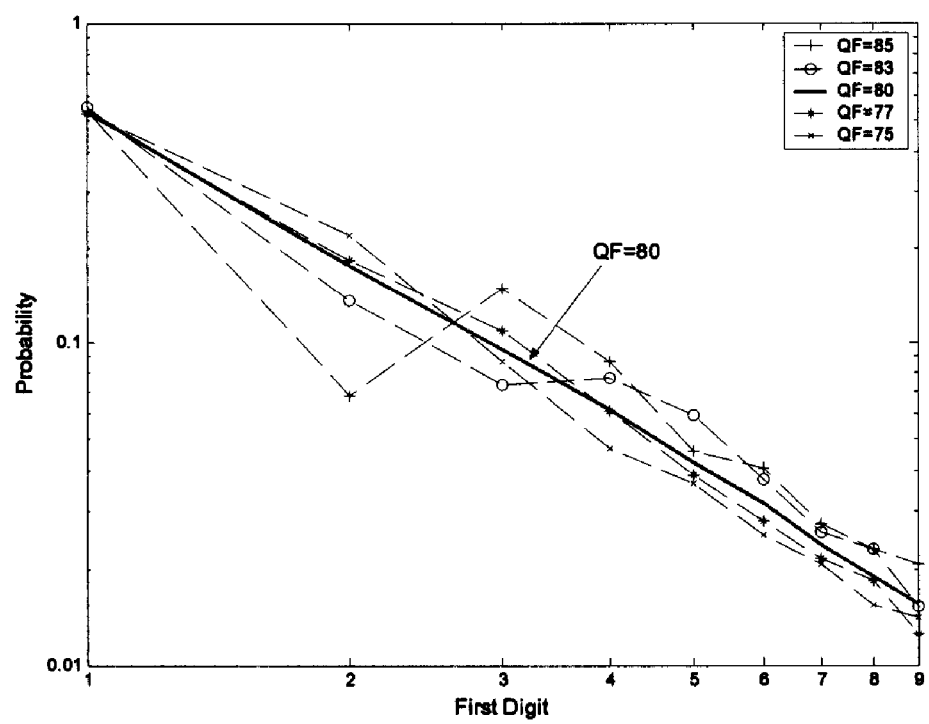
FIG. 9. illustrates the performance of the estimation of the JPEG compression Q-factor for a bitmap image.

FIG. 9 shows an example of experimental results using an above-discussed method with an exemplary embodiment of the invention that estimates the Q-factor of a given bitmap mage whose actually used Q-factor is 80 (i.e., an images was randomly selected from the UCID database and JPEG compressed with Q-factor 80). To estimate the Q-factor of this image, one first re-compresses the image by a sequence of different Q-factors. The corresponding first digit distributions of the JPEG coefficients are then calculated. The Q-factor associated with the JPEG re-compression having the least distribution artifacts compared with the generalized Benford's logarithm law model is chosen as the Q-factor estimate for the given image. Table 3illustrates exemplary numerical fitting results. As can be seen from Table 3, Q-factor 80 has the least fitting error. Q-factor 80 is then chosen as the estimation of the Q-factor for this test image. The estimation of the Q-factor in this example is correct.

TABLE 3

Fitting results for different re-compression Q-factors.

| | Model Parameters | | | Goodness-of-fit |
|---|---|---|---|---|
| Q-factor | N | q | s | (SSE) |
| 85 | 0.1966 | 0.475 | −0.9982 | 0.0082 |
| 83 | 0.4738 | 0.9793 | −0.9262 | 0.00072 |
| 80 | 1.227 | 1.571 | −0.4212 | 9.75616e−06 |
| 77 | 1.569 | 1.719 | −0.144 | 0.00016 |
| 75 | 3.537 | 2.388 | 1.41 | 0.00033 |

However, there is one limitation to the above-discussed Q-factor estimation approach. That is, when the re-compression quantization step size is exactly an integer multiple of the original compression quantization step size, there are no artifacts shown in the first digit distribution of the double-compressed JPEG coefficients. This is similar to the phenomenon in the histogram of the double-compressed JPEG image, as pointed out in J. Lukas and J. Fridrich, "Estimation of primary quantization matrix in double compressed JPEG images," *Proc. of DFRWS* 2003, Cleveland, Ohio, USA, Aug. 5-8 2003. To get around this limitation, in embodiments of the invention, the given test image is recompressed with various Q-factors, starting from the highest Q-factor 100 and gradually, monotonically decreasing Q-factors. Finally, the highest Q-factor associated with distortion below a predetermined threshold is selected as the estimate of the original Q-factor.

The following discusses embodiments of the invention for the detection of JPEG double-compression images. JPEG double-compression is an important issue in image steganalysis and forgery detection. In addition to the above-discussed concepts used in the detection for JPEG compression, the block discrete cosine transform (BDCT) of the image may also be determined for used in the detection method of embodiments of the invention. The procedure for computing the BDCT is described as follows. First, the given image is divided into K×K non-overlapping blocks. Then, the two-dimensional (2-D) discrete cosine transform (DCT) is applied to each block independently. Denoting a formed image block by $f(x,y), x,y=0,1,\ldots,N-1$, the DCT coefficient in a block is given by:

$$F(u, v) = \frac{2}{N} \sum_{x=0}^{N-1} \sum_{y=0}^{N-1} \Lambda(x)\Lambda(y) \cos\frac{\pi u(2x+1)}{2N} \cos\frac{\pi v(2y+1)}{2N} f(x, y), \quad (4)$$

$$u, v = 0, 1, \ldots N-1,$$

where $$\Lambda(x) = \begin{cases} \frac{1}{\sqrt{2}}, & x = 0 \\ 1, & \text{otherwise} \end{cases}. \quad (5)$$

with block size N×N, where N is equal to 8 in embodiments of the invention. After computing the BDCT, we have a BDCT coefficient 2-D array, which consists of the BDCT coefficients and has the same size as the image. As noted above, we choose block size N equal 8. Three different BDCT coefficient 2-D arrays are consequently obtained. We apply the same method for moment extraction on these three arrays to calculate a 108-dimensional (108-D) feature vector.

Figure 10A:
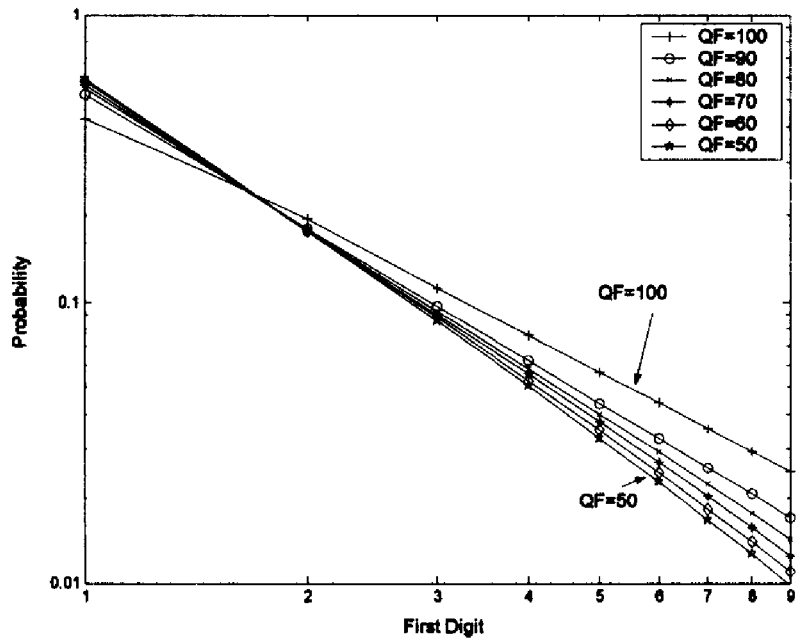
FIG. 10(a) illustrates distributions of the first digits of JPEG Coefficients for single-compressed (QF1: primary Q-factor; QF2: secondary Q-factor) (UCID database) (Log-Log scale).
Figure 10B:
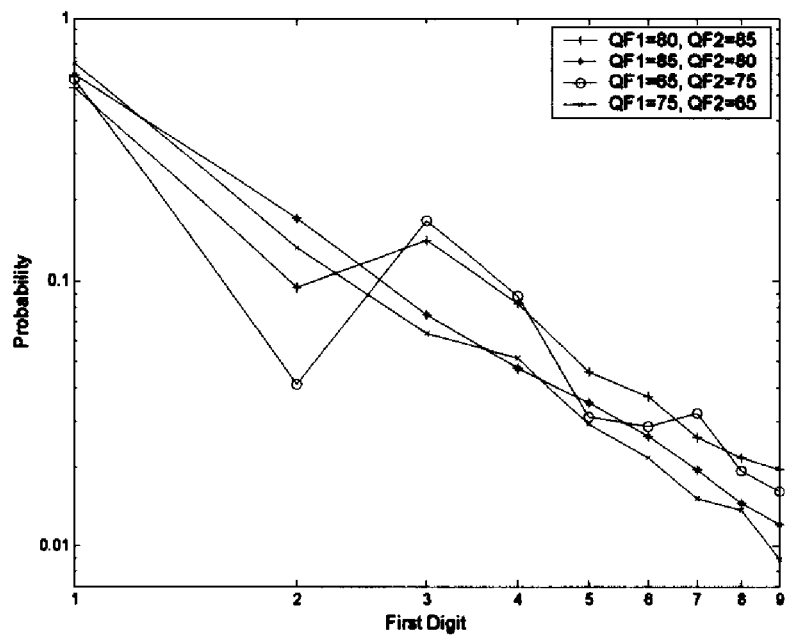
FIG. 10(b) illustrates distributions of the first digits of JPEG Coefficients for) double-compressed images (QF1: primary Q-factor; QF2: secondary Q-factor) (UCID database) (Log-Log scale).

Background art methods for detection of these types of images are typically based on the histogram artifacts introduced by the JPEG double-compression. However, as shown in FIG. 10(a) and FIG. 10(b), double-compression also causes severe violation of the first digit distribution of JPEG coefficients in accordance with the Benford's-like logarithmic law of embodiments of the invention. Thus, based on this fact, JPEG double-compression can be reliably detected by exploiting the artifacts in the distribution of the first digits of JPEG coefficients. Similar to the discussions above, either machine learning or non-learning algorithms can be used to discriminate the double-compressed JPEG image from the single compressed JPEG image.

The foregoing description illustrates and describes the present invention. Additionally, the disclosure shows and describes only the preferred embodiments of the invention, but as mentioned above, it is to be understood that the invention is capable of use in various other combinations, modifications, and environments and is capable of changes or modifications within the scope of the inventive concept as expressed herein, commensurate with the above teachings and/or skill or knowledge of the relevant art. The embodiments described hereinabove are further intended to explain best modes known of practicing the invention and to enable others skilled in the art to utilize the invention in such, or other embodiments and with the various modifications required by the particular applications or uses of the invention. Accordingly, the description is not intended to limit the invention to the form or application disclosed herein. Also, it is intended that the appended claims be construed to include alternative embodiments.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform or means for computing, performing, selecting, analyzing, determining or obtaining, may include, but are not limited to: one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, claimed subject matter is not limited in scope to this example. Likewise, an embodiment may be implemented as a system, or as any combination of components such as computer systems, mobile and/or other types of communication systems and other well known electronic systems.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method for detecting JPEG compression comprising:
   selecting a bitmap image;
   performing JPEG compression with a Q-Factor (QF) of 100 on the bitmap image to obtain a compressed bitmap image;
   selecting AC JPEG coefficients from the compressed bitmap image;
   computing a $1^{st}$ digit distribution corresponding to a most significant digit of the AC JPEG coefficients;
   analyzing the $1^{st}$ digit distribution of the AC JPEG coefficients to determine whether the most significant digits of the AC JPEG coefficients satisfy a predetermined distribution;
   determining the bitmap image as JPEG compressed if the most significant digits of the AC JPEG coefficients do not satisfy the predetermined distribution; and
   determining the bitmap image as at least one of not JPEG compressed or JPEG compressed with a QF =100 if the most significant digits of the AC JPEG coefficients satisfy the predetermined distribution.

2. The method of claim 1, wherein the predetermined distribution is a generalized Benford's logarithmic distribution defined by:

$$p(x) = N\log_{10}\left(1 + \frac{1}{s + x^q}\right), x = 1, 2, \ldots, 9,$$

wherein N is a normalization factor which makes p(x) a probability distribution, and wherein s and q are model parameters.

3. The method of claim 2, wherein s and q describe distributions for different images.

4. A method for estimating a JPEG compression Q-factor, comprising:
selecting a bitmap image that has been JPEG compressed once;
performing JPEG compression on the bitmap image with a present Q-factor (QF) of 100 to obtain a compressed bitmap image;
computing AC JPEG coefficients from the compressed bitmap image;
computing a $1^{st}$ digit distribution corresponding to most significant digits of the AC JPEG coefficients;
analyzing the $1^{st}$ digit distribution of the AC JPEG coefficients to determine whether the most significant digits of the AC JPEG coefficients satisfy a predetermined distribution;
determining the estimated QF of the bitmap image as the present QF if the most significant digits of the AC JPEG coefficients satisfy the predetermined distribution; and
if the most significant digits of the AC JPEG coefficients do not satisfy the predetermined distribution:
determining an updated QF by decreasing the present QF by an integer quantity, wherein the integer quantity is dependent upon an accuracy requirement for the estimated QF;
performing JPEG compression on the bitmap image with the updated QF as the present QF to obtain a new compressed bitmap image; and
performing, based on the new compressed bitmap image, said computing AC JPEG coefficients, said computing a $1^{st}$ digit distribution, said analyzing the $1^{st}$ digit distribution and either said determining the estimated QF or said determining an updated QF and said performing JPEG compression on the bitmap image with the updated QF.

5. The method of claim 4, wherein the QF starts from the present QF of 100 and is monotonically decreased by the integer quantity until the estimated QF is at least one of associated with a predetermined distortion or below a predetermined threshold.

6. The method of claim 5, wherein the predetermined distribution is a generalized Benford's logarithmic distribution defined by:

$$p(x) = N\log_{10}\left(1 + \frac{1}{s + x^q}\right), x = 1, 2, \ldots, 9,$$

wherein N is a normalization factor which makes p(x) a probability distribution, and wherein s and q are model parameters.

7. The method of claim 6, wherein s and q describe distributions for different images.

8. A processor-readable storage apparatus containing software code that, upon execution by a processor, causes the processor to implement operations relating to a method for detecting JPEG compression, said operations comprising:
selecting a bitmap image;
performing JPEG compression with a Q-Factor (QF) of 100 on the bitmap image to obtain a compressed bitmap image;
selecting AC JPEG coefficients from the compressed bitmap image;
computing a $1^{st}$ digit distribution corresponding to a most significant digit of the AC JPEG coefficients;
analyzing the $1^{st}$ digit distribution of the AC JPEG coefficients to determine whether the most significant digits of the AC JPEG coefficients satisfy a predetermined distribution;
determining the bitmap image as JPEG compressed if the most significant digits of the AC JPEG coefficients do not satisfy the predetermined distribution; and
determining the bitmap image as at least one of not JPEG compressed or JPEG compressed with a QF =100 if the most significant digits of the AC JPEG coefficients satisfy the predetermined distribution.

9. The processor readable storage apparatus of claim 8, wherein the predetermined distribution is a generalized Benford's logarithmic distribution defined by:

$$p(x) = N\log_{10}\left(1 + \frac{1}{s + x^q}\right), x = 1, 2, \ldots, 9,$$

wherein N is a normalization factor which makes p(x) a probability distribution, and wherein s and q are model parameters.

10. The processor-readable storage apparatus of claim 9, wherein s and q describe distributions for different images.

11. A processor-readable storage apparatus containing software code that, upon execution by a processor, causes the processor to implement operations relating to a method for estimating a JPEG compression Q-factor, said operations comprising:
selecting a bitmap image that has been JPEG compressed once;
performing JPEG compression on the bitmap image with a present Q-factor (QF) of 100 to obtain a compressed bitmap image;
computing AC JPEG coefficients from the compressed bitmap image;
computing a $1^{st}$ digit distribution corresponding to most significant digits of the AC JPEG coefficients;
analyzing the $1^{st}$ digit distribution of the AC JPEG coefficients to determine whether the most significant digits of the AC JPEG coefficients satisfy a predetermined distribution;
determining the estimated QF of the bitmap image as the present QF if the most significant digits of the AC JPEG coefficients satisfy the predetermined distribution; and
if the most significant digits of the AC JPEG coefficients do not satisfy the predetermined distribution:
determining an updated QF by decreasing the present QF by an integer quantity, wherein the integer quantity is dependent upon an accuracy requirement for the estimated QF;
performing JPEG compression on the bitmap image with the updated QF as the present QF to obtain a new compressed bitmap image; and
performing, based on the new compressed bitmap image, said computing AC JPEG coefficients, said computing a $1^{st}$ digit distribution, said analyzing the $1^{st}$ digit distribution, and either said determining the estimated QF or said determining an updated QF and said performing JPEG compression on the bitmap image with the updated QF.

12. The processor-readable storage apparatus of claim 11, wherein the QF starts from the present QF of 100 and is monotonically decreased by the quantity until the estimated QF is at least one of associated with a predetermined distortion and below a predetermined threshold.

13. The processor-readable storage apparatus of claim 12, wherein the predetermined distribution is a generalized Benford's logarithmic distribution defined by:

$$p(x) = N\log_{10}\left(1 + \frac{1}{s + x^q}\right), x = 1, 2, \ldots, 9,$$

wherein N is a normalization factor which makes p(x) a probability distribution, and
wherein s and q are model parameters.

14. The processor-readable storage apparatus of claim 13, wherein s and q describe distributions for different images.

15. An apparatus for detecting JPEG compression, the apparatus comprising:
means for selecting a bitmap image;
means for performing JPEG compression with a Q-Factor (QF) of 100 on the bitmap image to obtain a compressed bitmap image;
means for selecting AC JPEG coefficients from the compressed bitmap image;
means for computing a $1^{st}$ digit distribution corresponding to most significant digits of the AC JPEG coefficients;
means for analyzing the $1^{st}$ digit distribution of the AC JPEG coefficients to determine whether the most significant digits of the AC JPEG coefficients satisfy a predetermined distribution;
means for determining the bitmap image as JPEG compressed if the most significant digits of the AC JPEG coefficients do not satisfy the predetermined distribution; and
means for determining the bitmap image as at least one of not JPEG compressed or JPEG compressed with a QF =100 if the most significant digits of the AC JPEG coefficients satisfy the predetermined distribution.

16. An apparatus for estimating a JPEG compression Q-factor, the apparatus comprising:
means for selecting a bitmap image that has been JPEG compressed once;
means for performing JPEG compression on the bitmap image with a present Q-factor (QF) of 100 to obtain a compressed bitmap image;
means for computing AC JPEG coefficients from the compressed bitmap image;
means for computing a $1^{st}$ digit distribution corresponding to most significant digits of the AC JPEG coefficients;
means for analyzing the $1^{st}$ digit distribution of the AC JPEG coefficients to determine whether the most significant digits of the AC JPEG coefficients satisfy a predetermined distribution;
means for determining the estimated QF of the bitmap image as the present QF if the most significant digits of the AC JPEG coefficients satisfy the predetermined distribution; and
means for determining an updated QF by decreasing the present QF by an integer quantity if the most significant digits of the AC JPEG coefficients do not satisfy the predetermined distribution, wherein the integer quantity is dependent upon an accuracy requirement for the estimated QF, and for providing the updated QF to the means for performing JPEG compression;
wherein the means for performing JPEG compression is configured to perform JPEG compression of the bitmap image with the updated QF as the present QF to obtain a new compressed bitmap image; and
wherein the means for computing AC JPEG coefficients, means for computing a $1^{st}$ digit distribution and the means for analyzing are configured to operate on the new compressed bitmap image to provide the means for determining the estimate QF or the means for determining an updated QF with an analysis result.

17. A method for detecting a JPEG compression of an image, comprising:
computing an 8×8, non-overlapping block decomposition of a bitmap image;
applying a 2-D discrete block discrete cosine transform (BDCT) to respective blocks of the block decomposition independently to obtain AC BDCT coefficients of the respective blocks;
computing a $1^{st}$ digit distributions corresponding to most significant digits of the AC BDCT coefficients of blocks of the block decomposition;
analyzing the $1^{st}$ digit distribution of the AC BDCT coefficients to determine whether the most significant digits of the AC BDCT coefficients satisfy a predetermined distribution;
determining the bitmap image is a JPEG compressed image if said analyzing indicates that the most significant digits of the AC BDCT coefficients do not satisfy the predetermined distribution; and
determining the bitmap image is not a JPEG compressed image if said analyzing indicates that the most significant digits of the AC BDCT coefficients satisfy the predetermined distribution.

18. The method of claim 17, wherein the predetermined distribution is a generalized Benford's logarithmic distribution defined by:

$$p(x) = N\log_{10}\left(1 + \frac{1}{s + x^q}\right), x = 1, 2, \ldots, 9,$$

wherein N is a normalization factor which makes p(x) a probability distribution, and
wherein s and q are model parameters.

19. A method for detecting at least a double-compression of a JPEG image, comprising:
selecting a JPEG image;
selecting AC JPEG coefficients of the JPEG image;
computing a 1st digit distribution corresponding to most significant digits of the AC JPEG coefficients;
analyzing the $1^{st}$ digit distribution to determine whether the most significant digits of the AC JPEG coefficients satisfy a predetermined distribution;
determining the image has been JPEG compressed once or has been JPEG compressed multiple times with the same JPEG quality factor (QF) value if said analyzing determines that the most significant digits of the AC JPEG coefficients satisfy the predetermined distribution; and
determining the image has been JPEG compressed two or more times using different JPEG QF values if said analyzing determines that the most significant digits of the AC JPEG coefficients do not satisfy the predetermined distribution.

20. The method of claim 19, wherein the predetermined distribution is a generalized Benford's logarithmic distribution defined by:

$$p(x) = N\log_{10}\left(1 + \frac{1}{s + x^q}\right), x = 1, 2, \ldots, 9,$$

wherein N is a normalization factor which makes p(x) a probability distribution, and wherein s and q are model parameters.

* * * * *

UNITED STATES PATENT AND TRADEMARK OFFICE
CERTIFICATE OF CORRECTION

| | | |
|---|---|---|
| PATENT NO. | : 7,940,989 B2 | Page 1 of 1 |
| APPLICATION NO. | : 11/772636 | |
| DATED | : May 10, 2011 | |
| INVENTOR(S) | : Shi et al. | |

It is certified that error appears in the above-identified patent and that said Letters Patent is hereby corrected as shown below:

Title page, item (56), under "Other Publications", in Column 2, Line 14, delete "Imagin," and insert -- Imaging, --.

Column 14, line 19, in Claim 9, delete "processor readable" and insert -- processor-readable --.

Column 16, line 8, in Claim 16, delete "1$^s$digit distribution" and insert-- 1$^{st}$ digit distribution, --.

Column 16, line 18, in Claim 17, delete "discrete block discrete" and insert -- block discrete --.

Column 16, line 53, in Claim 19, delete "1st" and insert -- 1$^{st}$ --.

Signed and Sealed this
Twenty-third Day of August, 2011

David J. Kappos
*Director of the United States Patent and Trademark Office*